(12) United States Patent
Ushida et al.

(10) Patent No.: US 11,050,328 B2
(45) Date of Patent: Jun. 29, 2021

(54) ROTOR MANUFACTURING METHOD

(71) Applicant: AISIN AW CO., LTD., Anjo (JP)

(72) Inventors: Hideharu Ushida, Anjo (JP); Takehiro Anai, Anjo (JP)

(73) Assignee: AISIN AW CO., LTD., Anjo (JP)

( * ) Notice: Subject to any disclaimer, the term of this patent is extended or adjusted under 35 U.S.C. 154(b) by 241 days.

(21) Appl. No.: 16/082,741

(22) PCT Filed: Feb. 28, 2017

(86) PCT No.: PCT/JP2017/007772
§ 371 (c)(1),
(2) Date: Sep. 6, 2018

(87) PCT Pub. No.: WO2017/159348
PCT Pub. Date: Sep. 21, 2017

(65) Prior Publication Data
US 2019/0097503 A1    Mar. 28, 2019

(30) Foreign Application Priority Data

Mar. 14, 2016 (JP) .............................. JP2016-049923

(51) Int. Cl.
*H02K 15/02*       (2006.01)
*H02K 15/03*       (2006.01)
(Continued)

(52) U.S. Cl.
CPC .............. *H02K 15/03* (2013.01); *H02K 1/276* (2013.01); *H02K 1/28* (2013.01); *H02K 15/12* (2013.01); *Y10T 29/49012* (2015.01)

(58) Field of Classification Search
CPC ......... Y10T 29/49012; Y10T 29/49009; Y10T 29/4902; H02K 15/0012; H02K 1/26; H02K 15/02
(Continued)

(56) References Cited

U.S. PATENT DOCUMENTS 8,698,371 B2 *  4/2014  Komada ................. H02K 15/03
                                                       310/216.004
10,418,886 B2 *  9/2019  Nagai ................... H02K 15/022
(Continued)

FOREIGN PATENT DOCUMENTS

EP      2 821 437 A1     1/2015
JP      H06-86487 A      3/1994
(Continued)

OTHER PUBLICATIONS

May 16, 2017 International Search Report issued in International Patent Application No. PCT/JP2017/007772.
(Continued)

*Primary Examiner* — Thiem D Phan
(74) *Attorney, Agent, or Firm* — Oliff PLC

(57) ABSTRACT

A manufacturing method of a rotor including: preparing a rotor core that is structured by stacking a plurality of electromagnetic steel plates in an axial direction and that has a magnet insertion hole which extends in the axial direction; inserting a permanent magnet in the magnet insertion hole; curing a resin provided between an inner surface of the magnet insertion hole and an outer surface of the permanent magnet while pressure is applied to the rotor core in the axial direction, after the permanent magnet is inserted in the magnet insertion hole; and welding the electromagnetic steel plates along the axial direction after curing the resin.

18 Claims, 9 Drawing Sheets

(51) Int. Cl.
*H02K 1/27* (2006.01)
*H02K 15/12* (2006.01)
*H02K 1/28* (2006.01)

(58) Field of Classification Search
USPC ............... 29/598, 596, 604, 609, 732, 738
See application file for complete search history.

(56) References Cited

U.S. PATENT DOCUMENTS

| | | |
|---|---|---|
| 2008/0276446 A1 | 11/2008 | Amano et al. |
| 2009/0189309 A1 | 7/2009 | Matsubayashi et al. |
| 2010/0083486 A1 | 4/2010 | Amano et al. |
| 2011/0115126 A1 | 5/2011 | Matsubayashi et al. |
| 2011/0179633 A1 | 7/2011 | Amano et al. |
| 2012/0206007 A1 | 8/2012 | Kitagawa et al. |
| 2012/0305180 A1 | 12/2012 | Matsubayashi et al. |
| 2013/0106234 A1 | 5/2013 | Kagami et al. |
| 2013/0234363 A1 | 9/2013 | Nagai et al. |
| 2014/0151926 A1 | 6/2014 | Matsubayashi et al. |
| 2015/0130318 A1 | 5/2015 | Kitada et al. |
| 2018/0204676 A1 | 7/2018 | Nagai et al. |

FOREIGN PATENT DOCUMENTS

| | | |
|---|---|---|
| JP | 2002-345189 A | 11/2002 |
| JP | 2002-369424 A | 12/2002 |
| JP | 2006-211748 A | 8/2006 |
| JP | 2007-282358 A | 10/2007 |
| JP | 2007-282392 A | 10/2007 |
| JP | 5023124 B2 | 9/2012 |
| JP | 2012-228032 A | 11/2012 |
| JP | 2013-99047 A | 5/2013 |
| JP | 2013-153592 A | 8/2013 |
| JP | 2013-219970 A | 10/2013 |
| JP | 2015-100157 A | 5/2015 |
| JP | 2016-19300 A | 2/2016 |
| WO | 2006077998 A1 | 7/2006 |
| WO | 2007/080661 A1 | 7/2007 |
| WO | 2011/158316 A1 | 12/2011 |
| WO | 2012/081316 A1 | 6/2012 |
| WO | 2013/091943 A2 | 6/2013 |

OTHER PUBLICATIONS

Sep. 27, 2018 European Search Report issued in European Patent Application No. 17766351.5.

* cited by examiner

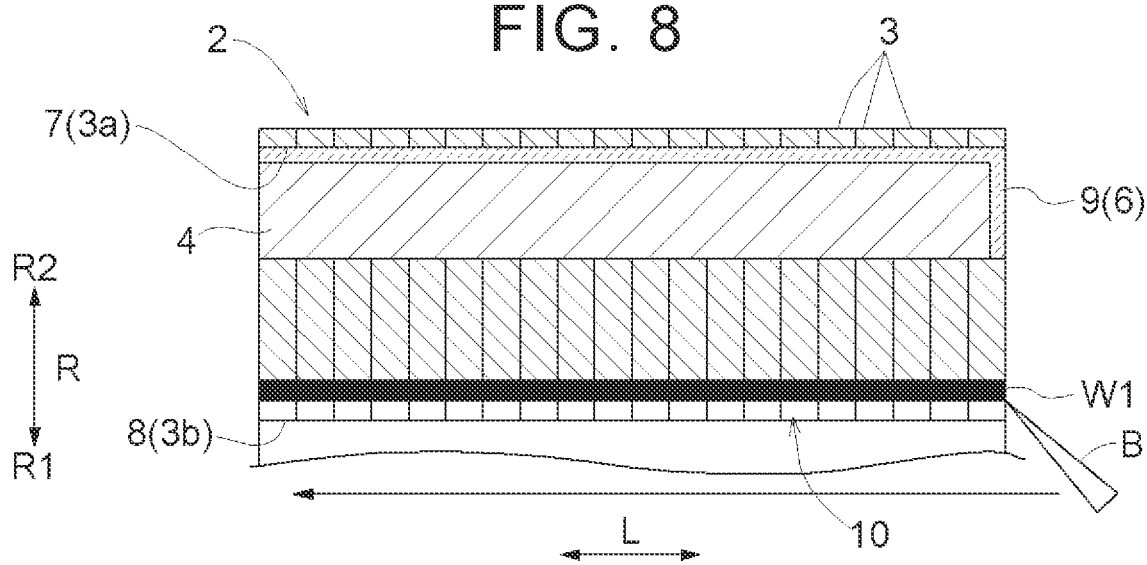
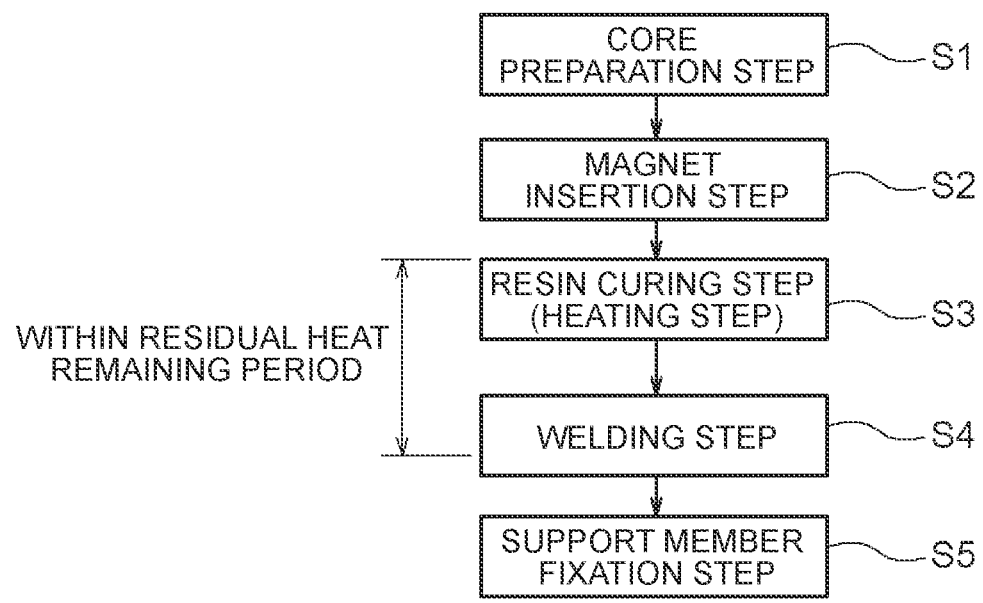

ROTOR MANUFACTURING METHOD

BACKGROUND

The present disclosure relates to a manufacturing method of a rotor that has a rotor core structured by stacking a plurality of electromagnetic steel plates in an axial direction.

A rotor manufacturing method described in Japanese Patent Application Publication No. 2002-369424 (JP 2002-369424 A) is known as such a rotor manufacturing method. Hereinafter, in the description of the background art, the background art will be described using the signs and the names of the members of JP 2002-369424 A in the ( ). In the rotor manufacturing method in JP 2002-369424 A, a plurality of electromagnetic steel plates (6) are welded to form a welding portion (23) continuously over the entire range of an iron core (5) in an axial direction, and thus, the electromagnetic steel plates (6) are joined.

There is a case in which the electromagnetic steel plates (6) have a warp. If the warped electromagnetic steel plates (6) are stacked in the axial direction, gaps appear between the stacked electromagnetic steel plates (6) (occupying ratio of iron decreases). Thus, when welding the electromagnetic steel plates (6), the occupying ratio of iron is increased by welding the electromagnetic steel plates (6) while the iron core (5) is compressed in the axial direction.

SUMMARY

However, as stated above, when the electromagnetic steel plates are welded while pressure is applied to the electromagnetic steel plates in the axial direction, the welding portion (23) that joins the electromagnetic steel plates (6) tends to crack when pressure applied to the iron core (5) was released, due to the stress remaining in the Iron core (5).

Thus, the realization of a manufacturing method of a rotor which can suppress cracks from forming in a welding portion that joins a plurality of electromagnetic steel plates is desired.

In view of the above, an exemplary manufacturing method of a rotor includes: preparing a rotor core that is structured by stacking a plurality of electromagnetic steel plates in an axial direction and that has a magnet insertion hole which extends in the axial direction; inserting a permanent magnet in the magnet insertion hole; curing a resin provided between an inner surface of the magnet insertion hole and an outer surface of the permanent magnet while pressure is applied to the rotor core in the axial direction, after the permanent magnet is inserted in the magnet insertion hole; and welding the electromagnetic steel plates along the axial direction after curing the resin.

According to the above characteristic configuration, the welding is performed after the resin curing. When the resin curing is performed before the welding, the electromagnetic steel plates can be integrated by curing the resin between the inner surface of the magnet insertion hole and the outer surface of the permanent magnet.

Additionally, by applying pressure to the electromagnetic steel plates in the axial direction when curing the resin between the inner surface of the magnet insertion hole and the outer surface of the permanent magnet in this way, the occupying ratio of iron in the rotor core in which the electromagnetic steel plates are integrated as stated above can be increased and the density of the rotor core can be increased.

In the electromagnetic steel plates, the inner surface of the magnet insertion hole and the outer surface of the permanent magnets are fixed with resin in addition to welding of the electromagnetic steel plates by the time the welding of the electromagnetic steel plates is completed, since the welding is performed after the resin curing. Thus, compared to when the electromagnetic steel plates are only joined by welding, the rigidity to the residual stress in the axial direction is higher and it is possible to suppress cracks from forming in a molten and solidified portion that joins the electromagnetic steel plates.

BRIEF DESCRIPTION OF THE DRAWINGS

FIG. 8 is an axial direction sectional view of the rotor core when the resin curing step is performed before the welding step.

FIG. 9 is a diagram of the manufacturing method of the rotor according to a second embodiment.

DETAILED DESCRIPTION OF EMBODIMENTS

1. First Embodiment

A rotor manufacturing method according to a first embodiment will be described with reference to the drawings. Here, a rotor 1 provided in an inner rotor-type rotary electric machine (rotor 1 for a rotary electric machine) will be described as an example of the rotor 1.

Figure 1:
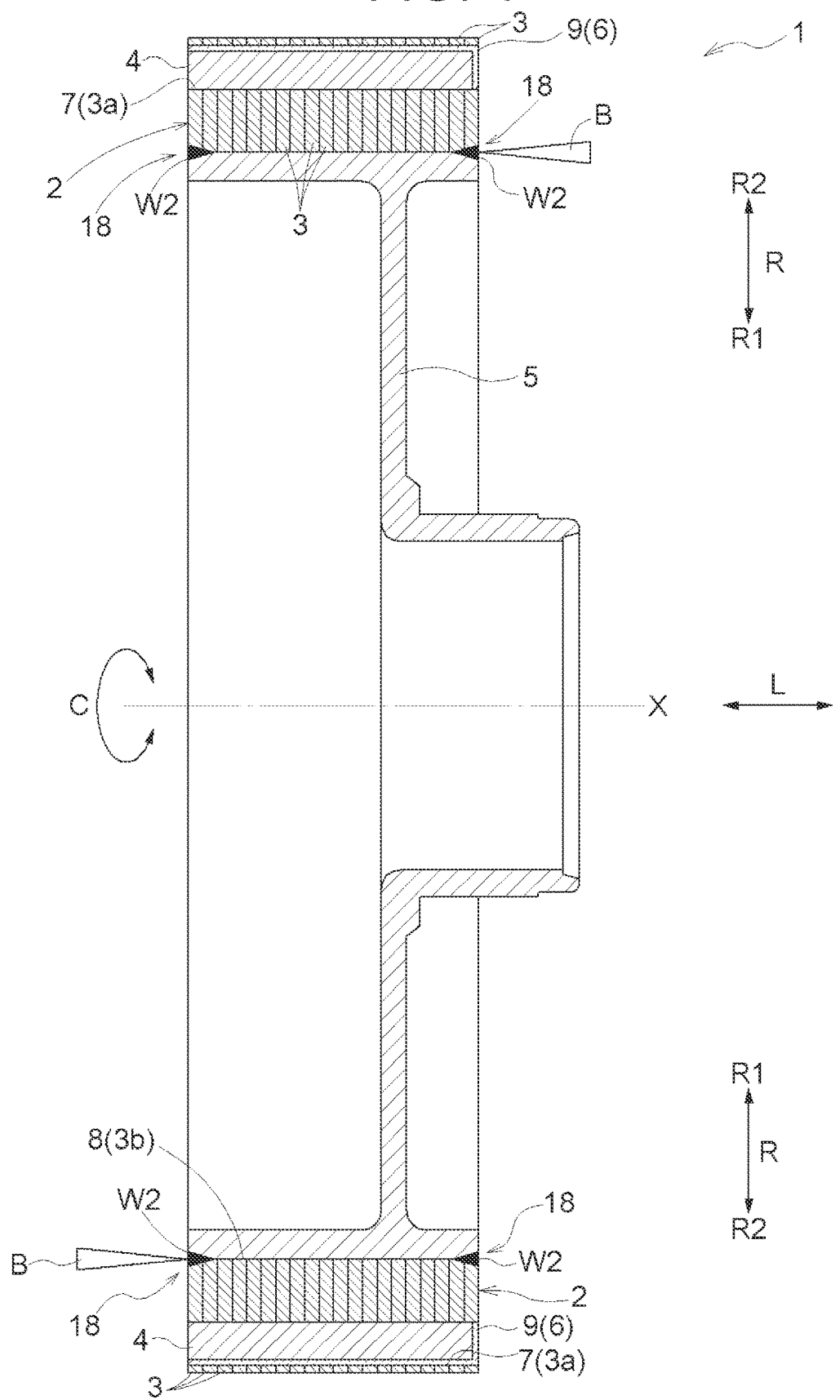
FIG. 1 is an axial direction sectional view of a rotor.

The rotor 1, a fixing material filling device 11 used for manufacturing the rotor 1, and the manufacturing method of the rotor 1 will be described in this order. In the following description, unless otherwise stated, an axis X of the rotor 1 is used as a reference for an "axial direction L", a "radial direction R", and a "circumferential direction C". Additionally, one side of the radial direction R of the rotor 1 is a first radial direction R1 side, and the other side is a second radial direction R2 side. As shown in FIG. 1, in the embodiment that shows the rotor 1 of the inner rotor-type rotary electric machine, the "first radial direction R1" indicates the inward direction along the radial direction R (toward the axis X), and the "second radial direction R2" indicates the outward direction along the radial direction R (toward a stator not shown). Thus, the "first radial direction R1 side" is the "inner radial side" and the "second radial direction R2 side" is the "outer radial side". The dimensions, the measurements, the arrangement directions, the arrangement positions etc. of the members include differences caused by errors (errors on a level allowable in manufacturing).

1-1. Rotor

Figure 2:
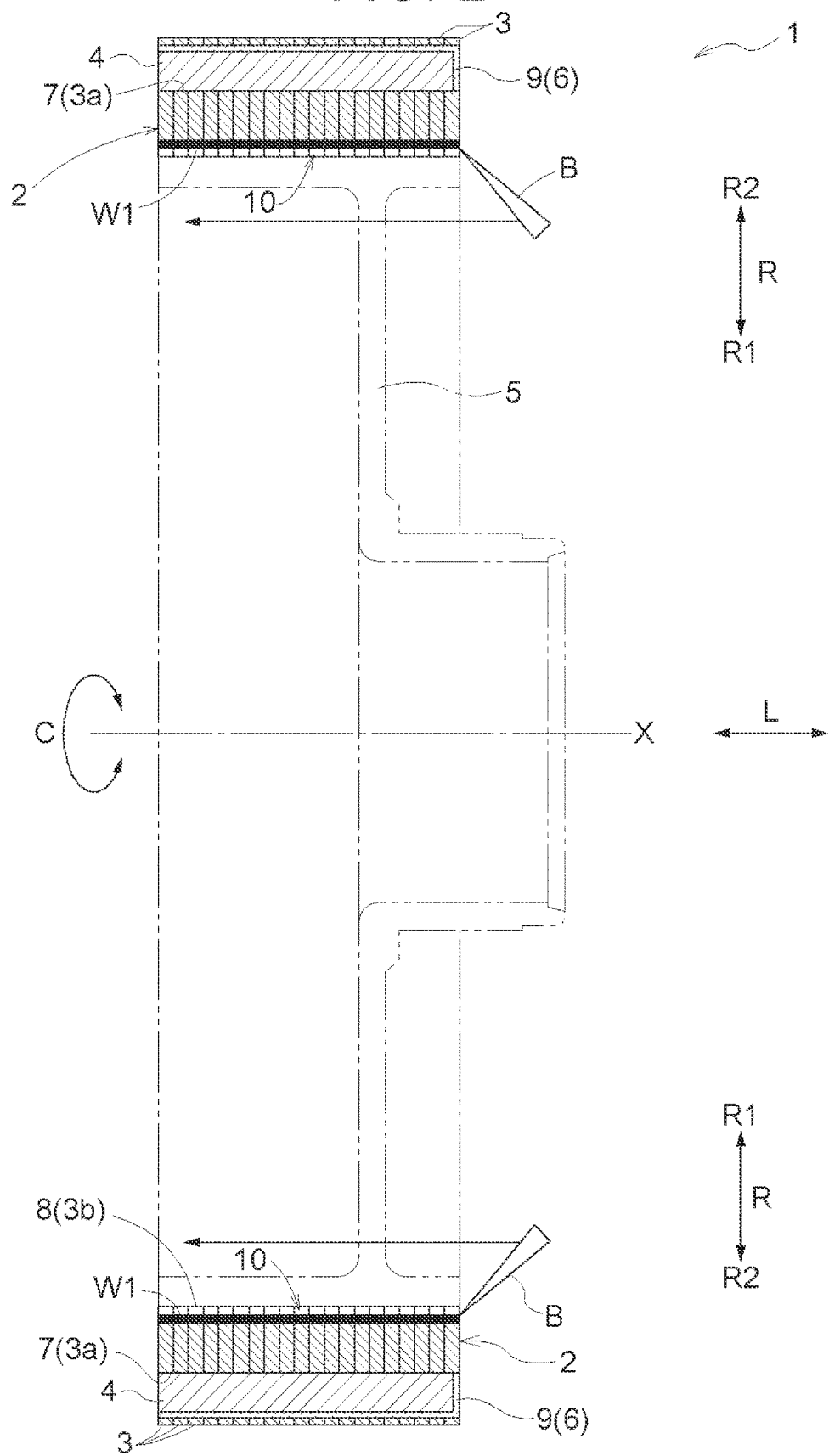
FIG. 2 is an axial direction sectional view of a rotor core.
Figure 3:
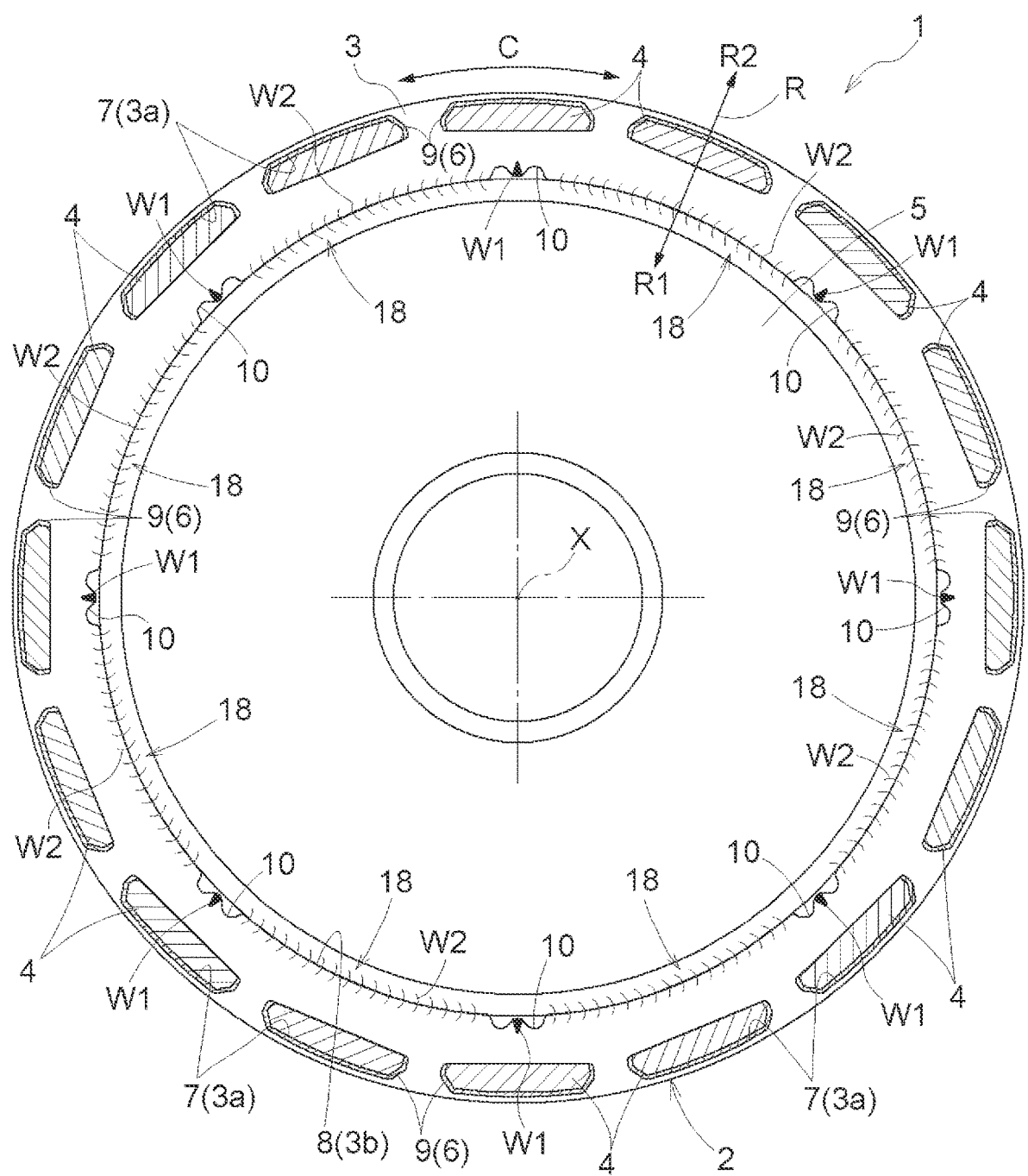
FIG. 3 is a plan view of the rotor seen in the axial direction.

As shown in FIGS. 1 to 3, the rotor 1 has a rotor core 2, permanent magnets 4, and a hub 5 (support member). In the embodiment, fixing members such as so-called end plates are not provided in both ends of the rotor core 2 in the axial direction L.

The rotor core 2 is structured by stacking a plurality of electromagnetic steel plates 3 in the axial direction L. Each of the electromagnetic steel plates 3 is formed in the shape of an annular disc. Each of the electromagnetic steel plates 3 has a rectangular insertion hole 3a in a plurality of places in the circumferential direction C, which extends through the electromagnetic steel plate 3 in the axial direction L. The insertion holes 3a constitute magnet insertion holes 7. The plurality of (sixteen in this example) insertion holes 3a are provided at equal intervals along the circumferential direction C of the rotor core 2. Additionally, each of the electromagnetic steel plates 3 has a circular center hole 3b in a radial center portion of the electromagnetic steel plate 3, which extends through the electromagnetic steel plate 3 in the axial direction L, the radial center portion being closer to the first radial direction R1 side than the insertion holes 3a.

The electromagnetic steel plates 3 are stacked so that the positions of the insertion holes 3a are aligned with each other and the positions of the center holes 3b are aligned with each other when viewed in the axial direction L. Since the electromagnetic steel plates 3 are stacked in this way, the insertion holes 3a of the electromagnetic steel plates 3 form the magnet insertion holes 7 that continue in the axial direction L and that extend through the rotor core 2 in the axial direction L. Additionally, the center holes 3b in the center of the electromagnetic steel plates 3 form a through hole 8 that continues in the axial direction L and that extends through the rotor core 2 in the axial direction L. In this way, the rotor core 2 has the magnet insertion holes 7 that extend through the rotor core 2 in the axial direction L in the portions on the second radial direction R2 side of the rotor core 2 and the through hole 8 that extends through the rotor core 2 in the axial direction L in the radial center portion of the rotor core 2.

The length of each of the permanent magnets 4 inserted in the each of magnet insertion holes 7 in the axial direction L is equal to or shorter than the length of the magnet insertion holes 7 of the rotor core 2 in the axial direction L. For example, when one permanent magnet 4 is inserted in the magnet insertion hole 7 in the axial direction L, the length of the permanent magnet 4 inserted in the magnet insertion hole 7 is the length of the permanent magnet 4 in the axial direction L. When a plurality of the permanent magnets 4 are inserted in the magnet insertion hole 7 side by side in the axial direction L, the length of the permanent magnets 4 inserted in the magnet insertion hole 7 is the sum of the lengths of the permanent magnets 4 in the axial direction L. In the embodiment, one permanent magnet 4 is inserted in the magnet insertion hole 7, in which the length of the permanent magnet 4 is slightly shorter than the length of the magnet insertion hole 7 in the axial direction L.

With the permanent magnet 4 inserted in the magnet insertion hole 7 of the rotor core 2, an outer surface of the permanent magnet 4 and the inner surface of the magnet insertion hole 7 are fixed using a fixing material 6. In the embodiment, a space between the inner surface of the magnet insertion hole 7 and the outer surface of the permanent magnet 4 is filled with the resin material 9 serving as the fixing material 6, using the fixing material filling device 11 (refer to FIGS. 4 and 5). Thus, the inner surface of the magnet insertion hole 7 and the outer surface of the permanent magnet 4 are fixed by this resin member 9. In the embodiment, the resin material 9 corresponds to the "resin". Both thermoplastic resin and thermosetting resin can be used as the resin material 9. Liquid crystal polymers such as aromatic polyester can be used as the thermoplastic resin. Epoxy resin or phenol resin etc. can be used as the thermosetting resin. In the embodiment, the thermoplastic resin such as liquid crystal polymer is used as the resin material 9. Regardless of whether thermoplastic resin or thermosetting resin is used as the resin material 9, the resin material 9 is cured so that the outer surface of the permanent magnet 4 and the inner surface of the magnet insertion hole 7 are fixed.

1-2. Fixing Material Filling Device

Next, the fixing material filling device 11 will be described.

Figure 4:
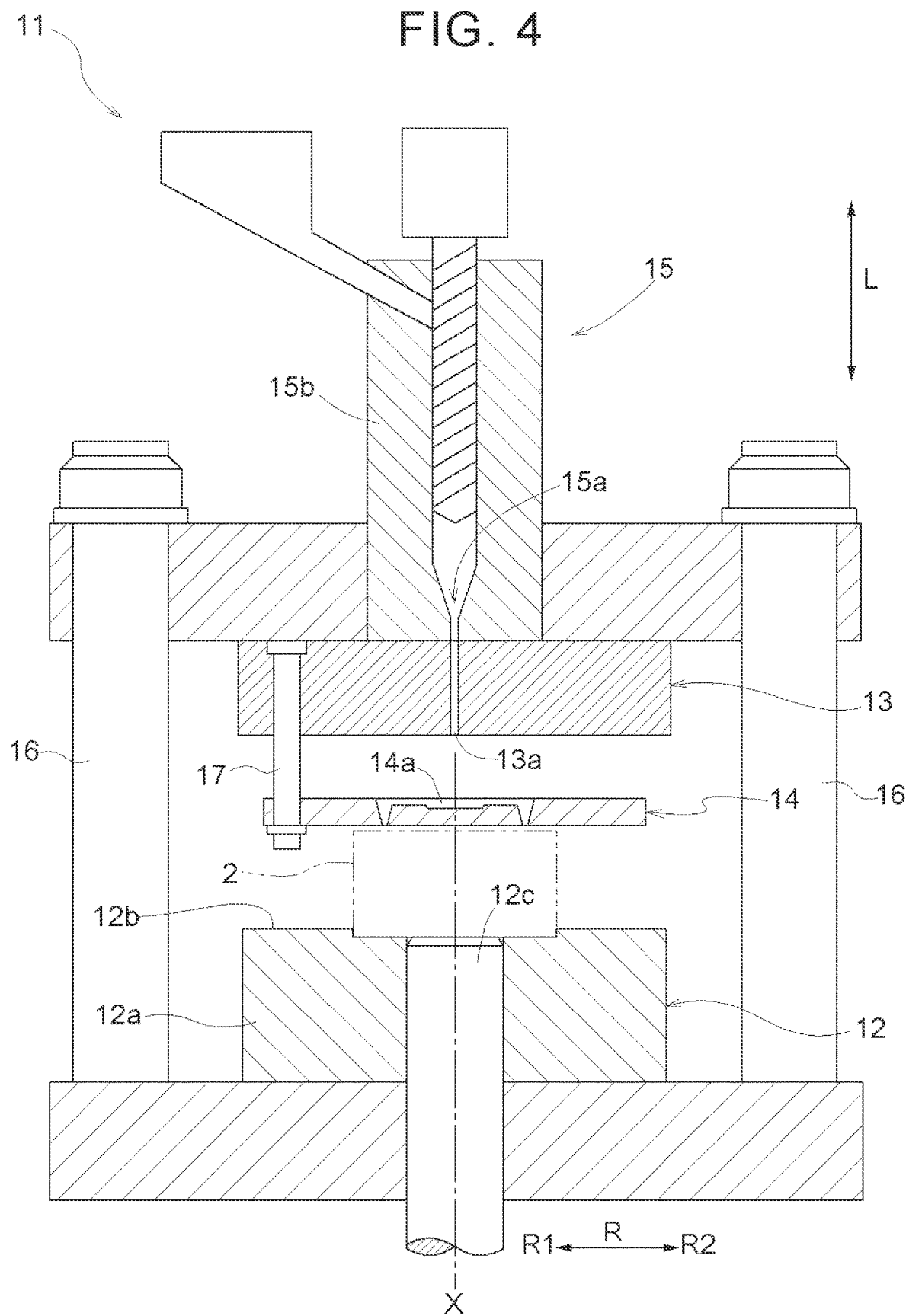
FIG. 4 is a side sectional view of a fixing material filling device.
Figure 5:
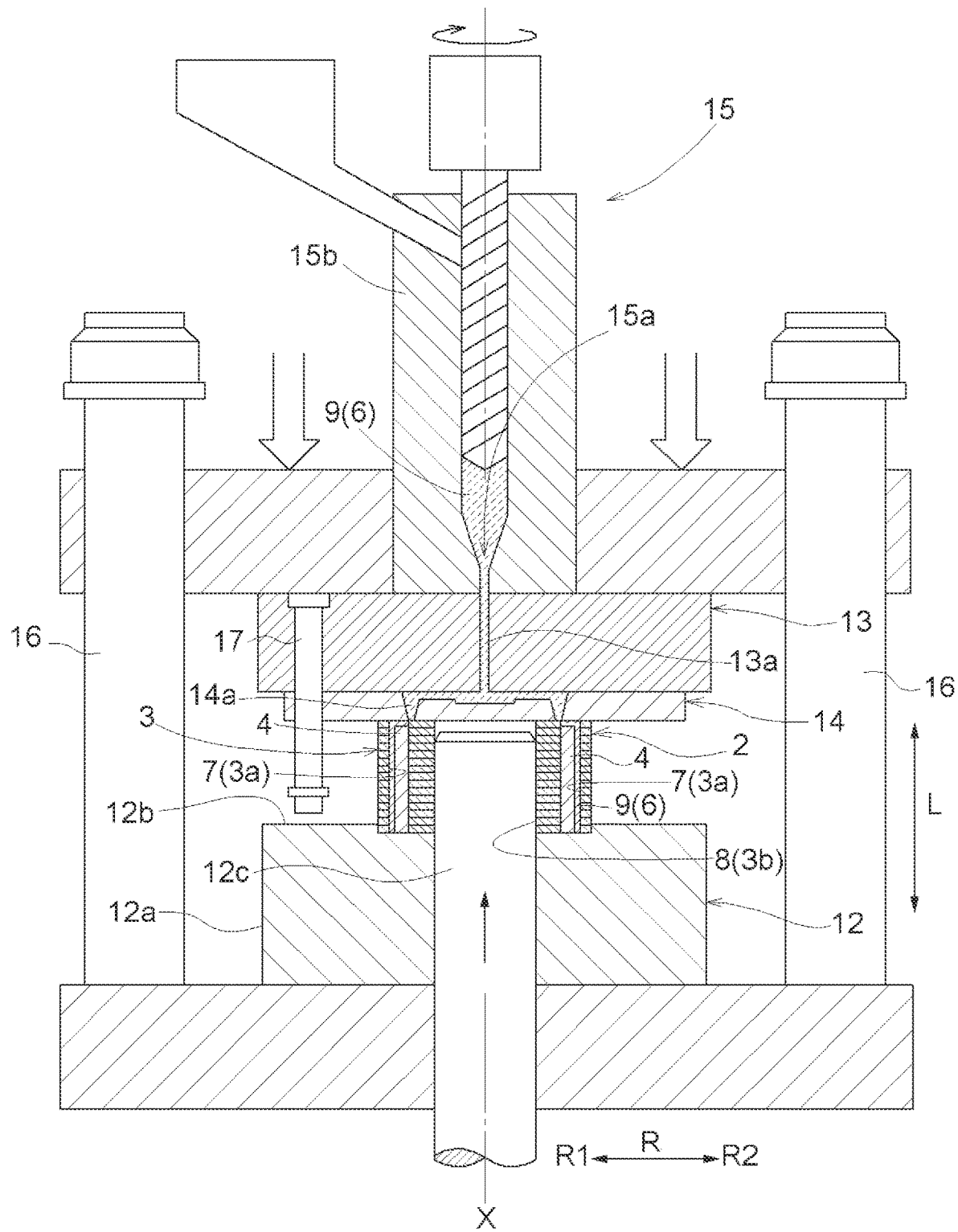
FIG. 5 is a side sectional view of the fixing material filling device.

As shown in FIGS. 4 and 5, the fixing material filling device 11 has a lower mold 12 which supports the rotor core 2 so that the rotor core 2 is at an attitude in which the axial direction L of the rotor core 2 goes along the up-down direction of the fixing material filling device 11, an upper mold 13 which is set above the lower mold 12, a gate plate 14 which is set between the lower mold 12 and the upper mold 13 in the up-down direction, and a fixing material supply portion 15 which supplies the melted resin material 9.

The lower mold 12 has a base 12a, an annular portion 12b, and a bar-shaped portion 12c. An upper surface of the base 12a forms a support surface that supports the rotor core 2 from below. The annular portion 12b is positioned on the second radial direction R2 side of the rotor core 2 that is supported by the support surface of the base 12a. The bar-shaped portion 12c is structured to be able to descend to a retreating height (height shown in FIG. 4) and ascend to a restricting height (height shown in FIG. 5) that is higher than the retreating height. The retreating height is a height at which an upper end of the bar-shaped portion 12c reaches the support surface of the base 12a. The restricting height is a height at which the upper end of the bar-shaped portion 12c is inserted in the through hole 8 of the rotor core 2 that is supported by the supporting surface of the base 12a. The rotor core 2 supported by the support surface of the base 12a is restricted in movement in the horizontal direction by the annular portion 12b and the bar-shaped portion 12c at the restricting height.

The upper mold 13 is structured to be movable to a reference height (height shown in FIG. 4) and a height lower than the reference height (height shown in FIG. 5), by being moved in the up-down direction along first guide bodies 16 by a driving portion not shown. The gate plate 14 is supported by the upper mold 13 via a second guide body 17. The gate plate 14 is structured to be relatively movable in the up-down direction with respect to the upper mold 13 by moving in the up-down direction along the second guide body 17. The fixing material supply portion 15 is supported by the upper mold 13 to be integrally movable with the upper mold 13 in the up-down direction.

The upper mold 13 has a first flow path 13a in which the melted resin material 9 flows. The first flow path 13a is connected to a discharge portion 15a of the fixing material supply portion 15. The gate plate 14 has a second flow path 14a in which the melted resin material 9 flows. The second flow path 14a is connected to the first flow path 13a when a lower surface of the upper mold 13 is in contact with an upper surface of the gate plate 14.

In the fixing material filling device 11 in a reference state (state shown in FIG. 4) in which the upper mold 13 is at the reference height, a lower surface of the gate plate 14 is brought into contact with an upper surface of the rotor core 2 supported by the lower mold 12 by lowering the upper mold 13. The second flow path 14a and the magnet insertion hole 7 are connected as the fixing material filling device 11 changes to this state.

By further lowering the upper mold 13, the upper mold 13 is lowered while the height of the gate plate 14 that is in contact with the rotor core 2 is maintained. In the fixing material filling device 11, the lower surface of the upper mold 13 is brought into contact with the upper surface of the gate plate 14, whereby a contact state (state shown in FIG. 5) is achieved.

When the fixing material filling device 11 is in the contact state described above, the fixing material filling device 11 drives the driving portion to lower the upper mold 13 further, so that the pressure applied to the rotor core 2 in the axial direction L is increased. When the pressure applied to the rotor core 2 in the axial direction L reaches a first pressure, the fixing material filling device 11 stops the driving portion and maintains the first pressure applied to the rotor core 2 in the axial direction L. In the embodiment, the first pressure is set around a limit pressure at which there are no gaps between the electromagnetic steel plates 3 that structure the rotor core 2 and the length of the rotor core 2 in the axial direction L will not become any shorter even if more pressure is applied.

The fixing material supply portion 15 discharges the resin material 9 melted due to heat by a heating portion 15b from the discharge portion 15a, while the first pressure is applied to the rotor core 2 in the axial direction L as stated above.

The discharged resin material 9 flows through the first flow path 13a and the second flow path 14a and is charged in the magnet insertion hole 7 of the rotor core 2. In this way, spaces between the inner surfaces of the magnet insertion holes 7 and the outer surfaces of the permanent magnets 4 are filled with the resin material 9. Until the resin material 9 supplied to the magnet insertion holes 7 of the rotor core 2 are cured, the fixing material filling device 11 maintains the first pressure applied to the rotor core 2 in the axial direction L. After the resin material 9 in the magnet insertion holes 7 is cured, the fixing material filling device 11 raises the upper mold 13 to the reference height.

1-3. Manufacturing Method of Rotor

Next, the manufacturing method of the rotor 1 will be described.

Figure 6:
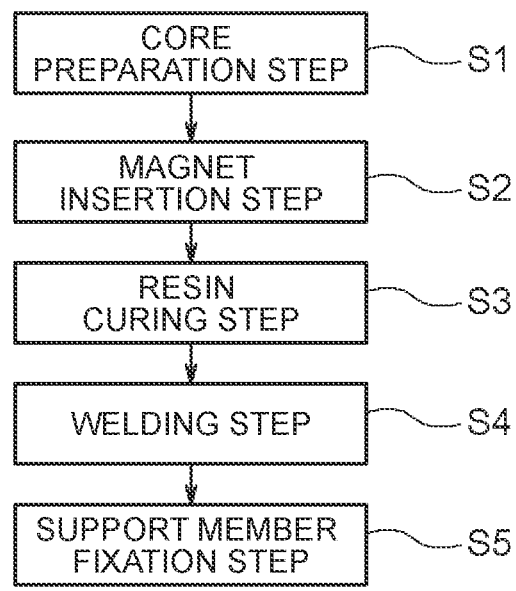
FIG. 6 is a diagram of a manufacturing method of the rotor.

As shown in FIG. 6, the manufacturing method of the rotor 1 includes a core preparation step S1, a magnet insertion step S2, a resin curing step S3, a welding step S4, and a support member fixation step S5. In the embodiment, the steps are performed in this order. The magnet insertion step S2 is performed after the core preparation step S1. The resin curing step S3 is performed after the magnet insertion step S2. The welding step S4 is performed after the resin curing step S3. The support member fixation step S5 is performed after the welding step S4.

(Core Preparation Step)

The core preparation step S1 is a step for preparing the rotor core 2. The rotor core 2 is structured by stacking the electromagnetic steel plates 3 in the axial direction L and has the magnet insertion holes 7 which extend in the axial direction L. The rotor core 2 prepared in this core preparation step S1 is the rotor core 2 that is structured by stacking the electromagnetic steel plates 3 in the axial direction L and that has the magnet insertion holes 7 which extend in the axial direction L, and although the electromagnetic steel plates 3 are stacked, the electromagnetic steel plates 3 are not joined to each other, and the permanent magnets 4 are not inserted in the magnet insertion holes 7. A core manufacturing step may be performed before the core preparation step S1. In the core manufacturing step, a core plate (steel plate) of a prescribed thickness is punched to manufacture the electromagnetic steel plates 3 of an annular disc shape having the insertion holes 3a and the center hole 3b in predetermined positions, and the electromagnetic steel plates 3 are stacked in the axial direction L to manufacture the rotor core 2.

(Magnet Insertion Step)

The magnet insertion step S2 is a step performed after the core preparation step S1 and is a step of inserting the permanent magnets 4 in the magnet insertion holes 7. In the magnet insertion step S2, the permanent magnets 4 are inserted in each of the magnet insertion holes 7 in the rotor core 2.

(Resin Curing Step)

The resin curing step S3 is a step of curing the resin material 9 provided between the inner surfaces of the magnet insertion holes 7 and the outer surfaces of the permanent magnets 4 when pressure is applied to the rotor core 2 in the axial direction L, after the magnet insertion step S2. In the embodiment, the inner surfaces of the magnet insertion holes 7 and the outer surfaces of the permanent magnets 4 are fixed with the resin material 9 in the resin curing step S3. Thus, the resin curing step S3 can also be called a magnet fixing step for fixing the inner surfaces of the magnet insertion holes 7 and the outer surfaces of the permanent magnets 4 when the pressure is applied to the rotor core 2 in the axial direction L. In the embodiment, spaces between the inner surfaces of the magnet insertion holes 7 and the outer surfaces of the permanent magnets 4 are filled with the resin material 9 using the fixing material filling device 11 to fix the inner surfaces of the magnet insertion holes 7 and the outer surfaces of the permanent magnets 4 with the resin material 9.

Specifically, as shown in FIGS. 4 and 5, the first pressure is applied to the rotor core 2 in the axial direction L using the fixing material filling device 11. Pressure is applied to the rotor core 2 in the axial direction L in this way to compress the rotor core 2 in the axial direction L, thereby achieving a state in which there are no gaps or hardly any gaps between the electromagnetic steel plates 3 and increasing the occupying ratio of iron in the rotor core 2 of the finished rotor 1 to increase the density of the rotor core 2. The inner surfaces of the magnet insertion holes 7 and the outer surfaces of the permanent magnets 7 are fixed with the resin material 9 by charging the melted resin material 9 in the magnet insertion holes 7 of the rotor core 2 and solidifying (curing) the resin material 9, while applying pressure to the rotor core 2 in the axial direction L. The state in which the first pressure is applied to the rotor core 2 in the axial direction L is maintained until the fixation of the inner surfaces of the magnet insertion holes 7 and the outer surfaces of the permanent magnets 7 by the resin material 9 is completed. Once the fixation by the resin material 9 is completed, the pressure applied in the axial direction L may be reduced or removed. As stated above, in the embodiment, the inner surfaces of the magnet insertion holes 7 and the outer surfaces of the permanent magnets 7 are fixed using thermoplastic resin such as liquid crystal polymer as the resin material 9. In this case, the charged resin material 9 solidifies (is cured) by being cooled. Thermosetting resin such as phenol resin and epoxy resin may be used as the resin material 9. In this case, the charged resin material 9 solidifies (is cured) by being heated. Thus, when executing the resin curing step S3, a filling device that uses thermosetting resin may be used instead of the fixing material filling device 11 that uses thermoplastic resin.

(Welding Step)

The welding step S4 is a step of welding the electromagnetic steel plates 3 along the axial direction L after the resin curing step S3. In the embodiment, the welding step S4 is a step performed after the resin curing step S3, in which the electromagnetic steel plates 3 are welded continuously over the entire area of the rotor core 2 in the axial direction L. However, the electromagnetic steel plates 3 do not necessarily have to be welded continuously over the entire are of the rotor core 2 in the axial direction L. In the welding step S4, the electromagnetic steel plates 3 may be welded along a partial region of the rotor core 2 in the axial direction L. The electromagnetic steel plates 3 may also be welded intermittently in the axial direction L by pulse welding, for example.

As shown in FIGS. 2 and 3, welding portions 10 are formed in the inner peripheral surface of the rotor core 2 as welding spots for welding the electromagnetic steel plates 3 together. In the welding step S4, while applying a second pressure to the rotor core 2 in the axial direction L, for example, energy beams B such as electron beams and laser beams are irradiated to the welding portion 10 to melt the electromagnetic steel plates 3 and then the electromagnetic steel plates 3 are solidified. Thus, the electromagnetic steel plates 3 adjacent to each other are welded together in the axial direction L. In this example, the welding step S4 is performed by laser welding using laser beams. Thus, the welding spots can be locally heated. In the welding step S4, the inner peripheral surface of the through hole 8 is welded. First molten and solidified portions W1 represent portions of the electromagnetic steel plates 3 that were welded and solidified by energy beams B irradiated along the axial direction L. The welding portion 10 may be welded by methods other the method using than energy beams B such as TIG welding or arc welding.

The second pressure that is applied to the rotor core 2 in the axial direction L in the welding step S4 is smaller than the first pressure applied to the rotor core 2 in the axial direction L in the resin curing step S3. The second pressure can be smaller than the first pressure since the inner surfaces of the magnet insertion holes 7 and the outer surfaces of the permanent magnets 7 are fixed by the resin material 9. Thus, when the first pressure is removed, the rotor core 2 compressed by the first pressure in the axial direction L in the resin curing step S3 and having no gap between the electromagnetic steel plates 3 tends to extend in the axial direction L due to residual stress. However, since the inner surfaces of the magnet insertion holes 7 and the outer surfaces of the permanent magnets 4 are fixed by the resin material 9, the residual stress that tends to extend in the axial direction L can be supported by the permanent magnets 4 and the resin material 9. Thus, the state in which there are no gaps or hardly any gaps between the electromagnetic steel plates 3 can be maintained. Thus, in the welding step S4, there is no need to compress the rotor core 2 in the axial direction L to eliminate the gaps between the electromagnetic steel plates 3. Therefore, the pressure applied to the rotor core 2 in the axial direction L can be made smaller, compared to the first pressure applied to the rotor core 2 in the axial direction L in the resin curing step S3. In the welding step S4, it is possible not to apply pressure to the rotor core 2 in the axial direction L (set the second pressure to zero), or to apply a pressure of such a degree that the electromagnetic steel plates 3 are prevented from floating up from other electromagnetic steel plates 3, which is caused by the deformation of the electromagnetic steel plates 3 due to the heat from welding, e.g., a pressure that is about one-tenth of the first pressure.

(Support Member Fixation Step)

The support member fixation step S5 is a step that is performed after the welding step S4, and is a step of inserting the hub 5 in the through hole 8 and welding only joining portions 18 between the hub 5 and both ends of the rotor core 2 in the axial direction L. As shown in FIGS. 1 and 3, in both ends of the rotor core 2 in the axial direction L, the energy beams B are irradiated to the circumferential joining portion 18 at which the hub 5 abuts against the rotor core 2 so that the hub 5 and the rotor core 2 are welded. Second molten and solidified portions W2 are formed on the joining portions 18 at which the hub 5 abuts against the rotor core 2.

1-4. Comparative Example

A case in which the resin curing step S3 is not performed before the welding step S4 will be discussed as a comparative example. Even in this case, pressure is applied to the rotor core 2 in the axial direction L to increase the density of the rotor core 2. The pressure is applied in the welding step in which the length of the rotor core 2 in the axial direction L is determined. Thus, the welding step S4 is performed while the first pressure is being applied to the rotor core 2 in the axial direction L. However, the inner surfaces of the magnet insertion holes 7 and the outer surfaces of the permanent magnets 7 are not yet fixed when the welding step S4 is completed.

Figure 7:
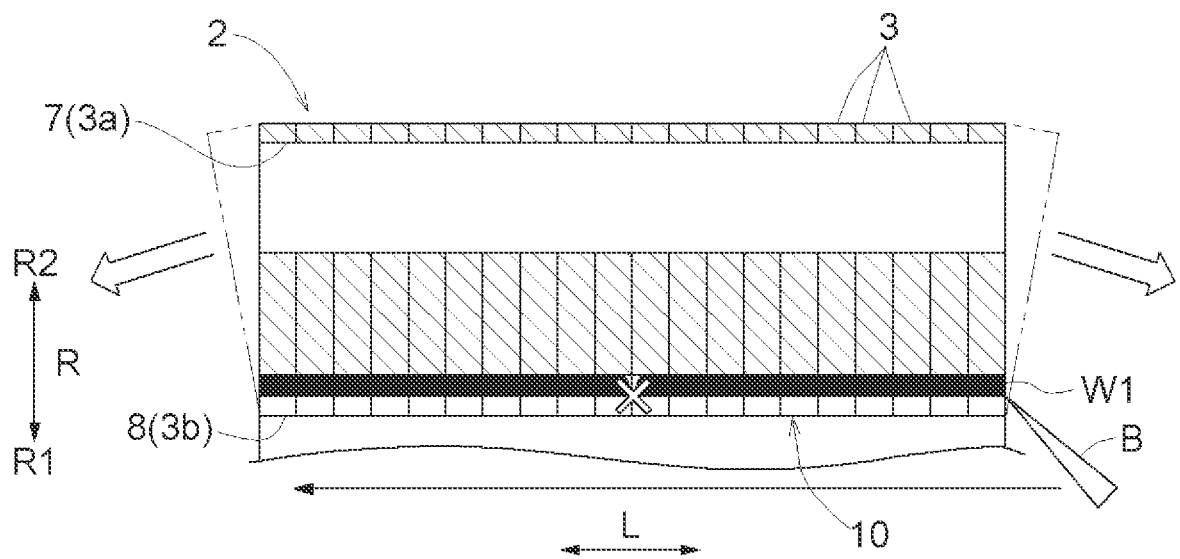
FIG. 7 is an axial direction sectional view of the rotor core when a resin curing step is performed after a welding step.

Thus, the electromagnetic steel plates 3 are only fixed to each other at the first molten and solidified portions W1. Therefore, when the pressure applied to the rotor core 2 in the axial direction L is released after the welding step S4 is completed, the electromagnetic steel plates 3 tend to move apart from each other in the axial direction L due to the residual stress of the rotor core 2, as schematically shown in FIG. 7. Due to the residual stress of the rotor core 2, tensile load and bending load are applied to the first molten and solidified portions W1 and cracks are likely to be formed in the first molten and solidified portions W1.

If the resin curing step S3 is performed before the welding step S4, in which the inner surfaces of the magnet insertion holes 7 and the outer surfaces of the permanent magnets 7 are fixed while pressure is applied to the rotor core 2 in the axial direction L, the inner surfaces of the magnet insertion holes 7 and the outer surfaces of the permanent magnets 7 are fixed and the electromagnetic steel plates 3 are fixed to each other by the first molten and solidified portions W1 when the welding step S4 is completed. Thus, even when the pressure applied to the rotor core 2 in the welding step S4 is released, the residual stress of the rotor core 2 can be supported by a fixation portion of the inner surfaces of the magnet insertion holes 7 and the outer surfaces of the permanent magnets 4. As schematically shown in FIG. 8, it is possible to regulate the separation of the electromagnetic steel plates 3 from each other in the axial direction L and reduce the possibility of cracks forming in the first molten and solidified portions W1.

2. Second Embodiment

Next, a manufacturing method of a rotor according to a second embodiment will be described. In the second embodiment, the resin material 9 (resin) is expanded and cured by heating. Additionally, as shown in FIG. 9, the difference between the second embodiment and the first embodiment is that a heating step is included in the resin curing step S3 in the second embodiment. In the resin curing step S3, the heating step for expanding and curing the resin material 9 is performed and the welding step S4 is performed while the residual heat generated by the heating step remains. Since the points that are not specifically described below are similar to the first embodiment, the description thereof will be omitted.

In the embodiment, thermosetting resin including an expanding material is used as the resin material 9 so that the resin material 9 is expanded and cured by heating. Here, a foaming agent is used as the expanding material, for example. Additionally, epoxy resin is used as the thermosetting resin for the base material. It is preferable that a resin material in which heat expanding capsules are contained in the base material that includes epoxy resin etc. is used as the resin material 9. Thermoplastic resin capsules in which liquid that vaporizes by being heated is enclosed etc. may be used as the capsule. Such resin will be described below as a foaming resin 25. The foaming resin 25 is foamed, expanded, and then cured by heating.

Figure 10:
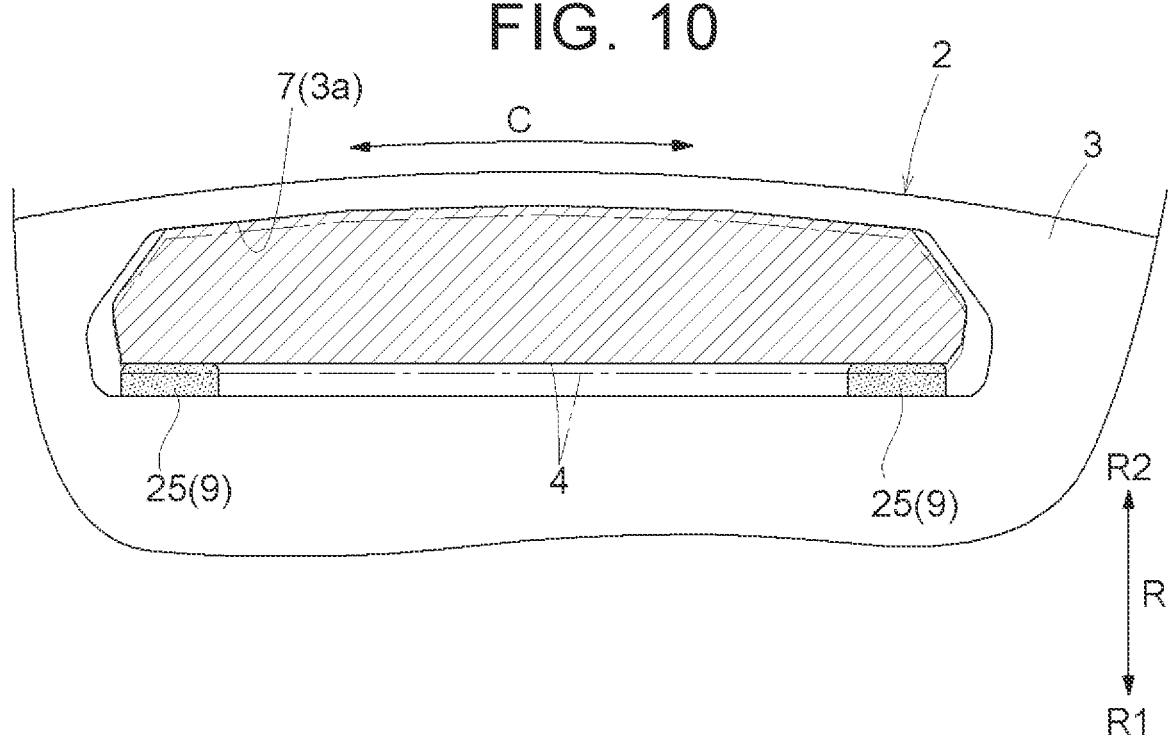
FIG. 10 is an enlarged plan view of a main portion of the rotor seen in the axial direction according to the second embodiment.

As shown in FIG. 10, the foaming resin 25 is provided between the inner surface of the magnet insertion hole 7 and the outer surface of the permanent magnet 4. The foaming resin 25 is expanded and cured by heating so as to fix the inner surface of the magnet insertion hole 7 and the outer surface permanent magnet 4. Here, it is preferable that the foaming resin 25 is provided between: a surface on the opposite side of the permanent magnet 4 from a surface facing the stator (not shown); and the inner surface of the magnet insertion hole 7. Thus, the permanent magnet 4 can be pressed against the stator side of the magnet insertion hole 7 (here, the outer peripheral surface side of the rotor core 2) with the expansion of the foaming resin 25. As a result, the magnetic field of the permanent magnet 4 that acts on the stator can be strengthened. Additionally, since the foaming resin 25 is thin during the insertion stage of the permanent magnet 4 at which heating is not performed, certain gaps can be formed between the outer surface of the permanent magnet 4 and the inner surface of the magnet insertion hole 7. Thus, it is possible to suppress the resin material 9 applied to the permanent magnet 4 (foaming resin 25) from coming into contact with the inner surface of the magnet insertion hole 7 and peeling off, while the permanent magnet 4 is being inserted in the magnet insertion hole 7. In FIG. 10, the position of the permanent magnet 4 before expansion of the foaming resin 25 is shown by a long dashed double-short dashed line and the position of the permanent magnet 4 after expansion of the foaming resin 25 is shown by a solid line.

Since the second embodiment shows the rotor 1 provided in the inner rotor-type rotary electric machine, the foaming resin 25 is provided between the surface of the permanent magnet 4 on the first radial direction R1 side (inner radial side) and the portion of the inner peripheral surface of the magnet insertion hole 7 on the first radial direction R1 side (inner radial side) (see FIG. 10).

Figure 11:
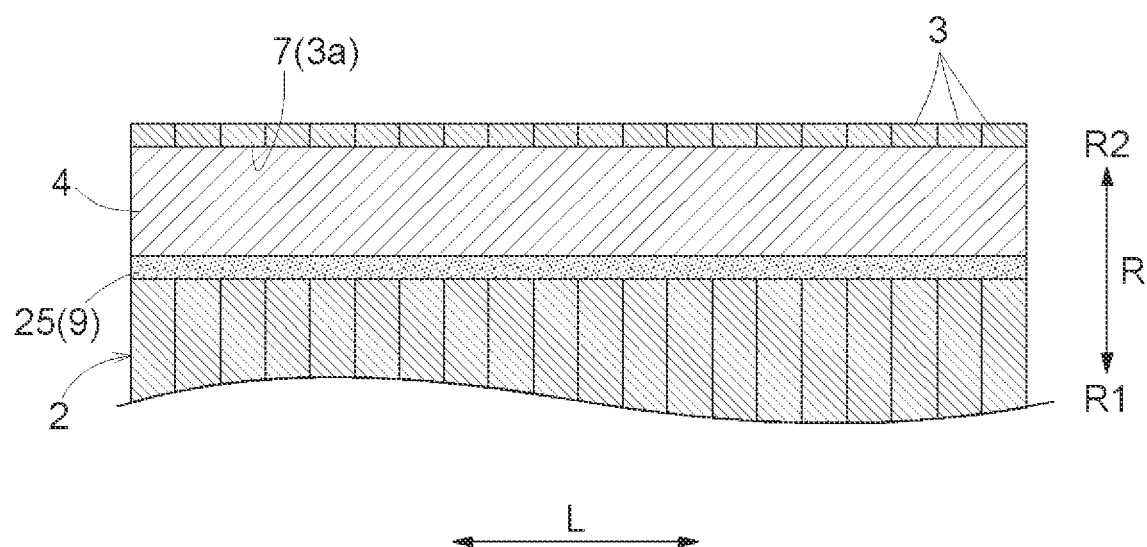
FIG. 11 is an enlarged view of a main portion of the rotor according to the second embodiment.

Additionally, in the second embodiment, the foaming resin 25 is provided over the entire area of the permanent magnet 4 (magnet insertion hole 7) in the axial direction L (see FIG. 11). Thus, the permanent magnet 4 can be uniformly pressed by the expansion of the foaming resin 25 in the second radial direction R2 over the entire area in the axial direction L.

In the second embodiment, the magnet insertion step S2 is performed with the foaming resin 25 applied to the permanent magnets 4. That is, the foaming resin 25 is applied to the permanent magnets 4 before the magnet insertion step S2. It is preferable that the foaming resin 25 is applied so that the thickness of the foaming resin 25 is constant along the surface of each permanent magnet 4. After the foaming resin 25 is applied, the foaming resin 25 is heated at a non-foaming temperature, at which the foaming resin 25 does not foam, so as to dry the foaming resin 25 (preliminary curing). After the primary curing of the foaming resin 25 is completed, the magnet insertion step S2 is performed with the foaming resin 25 applied to the permanent magnets 4. The step of uniforming the thickness of the foaming resin 25 applied to the permanent magnets 4 may be performed before or after the primary curing of the foaming resin 25.

After the magnet insertion step S2, the resin curing step S3 is performed. In the resin curing step S3, the foaming resin 25 is heated at a foaming temperature, at which the foaming material of the foaming resin 25 foams, so as to expand the foaming resin 25 (resin material 9). Then, the foaming resin 25 (resin material 9) is further heated at a curing temperature so that the foaming resin 25 is cured (main curing). Thus, the foaming resin 25 is expanded and cured to press the permanent magnets 4 toward the stator and also to fix the inner surfaces of the magnet insertion holes 7 to the outer surfaces of the permanent magnets 4.

The foaming resin 25 is heated by heating the whole rotor core 2, with the permanent magnets 4 (and the foaming resin 25) inserted in the magnet insertion holes 7 in the rotor core 2. In the embodiment, the foaming resin 25 is heated by heating the whole rotor core 2 in a furnace. In this way, in the second embodiment, the resin curing step S3 includes a heating step of the rotor core 2.

After the resin curing step S3, the welding step S4 is performed. Typically, as the difference between a temperature before welding and a temperature during welding (melting point) at the welding spots (here, the first molten and solidified portions W1) increases, a heat contraction amount after welding increases and cracks are more likely to occur in the welding spots. The temperature of the welding portion during welding is determined by the melting point of a material (here, the electromagnetic steel plates 3). Thus, the lower the temperature of the material before welding, the higher the probability of cracks forming in the welding spots (weld cracks) is. Specifically, when the welding spots are locally heated by laser welding etc., a temperature gradient between the welding spots and the peripheries of the welding spots increases. Thus, the problem of weld cracking becomes significant.

Thus, in the second embodiment, the welding step S4 is performed with the temperature of the rotor core 2 higher than an atmospheric temperature since the rotor core 2 is heated in the resin curing step S3. In other words, the welding step S4 is performed while the residual heat from the heating in the resin curing step S3 (heating step) remains. Thus, the welding spots can be welded with the temperature of the whole rotor core 2 high. Therefore, compared to when the welding step S4 is performed without heating the rotor core 2, the temperature difference of the welding spots between before and after welding can be decreased. Thus, the possibility of crack generation in the welding spots (molten and solidified portions W1) can be lowered.

3. Other Embodiments

Next, other embodiments will be described.

(1) In the above embodiments, examples in which the magnet insertion holes 7 are filled with resin material 9 that serves as the fixing material 6 after the permanent magnets 4 are inserted in the magnet insertion holes 7 are described.

However, an adhesive 23 may be used as the fixing material 6, instead of filling the magnet insertion holes 7 with the resin material 9. In this case, for example, the permanent magnets 4 are inserted in the magnet insertion holes 7 after the adhesive 23 is applied on the surfaces of the permanent magnets 4 that are not yet inserted in the magnet insertion holes 7. The permanent magnets 4 may be inserted in the magnet insertion holes 7 after the adhesive 23 is applied to the inner surfaces of the magnet insertion holes 7 in which the permanent magnets 4 are not yet inserted.

Figure 12:
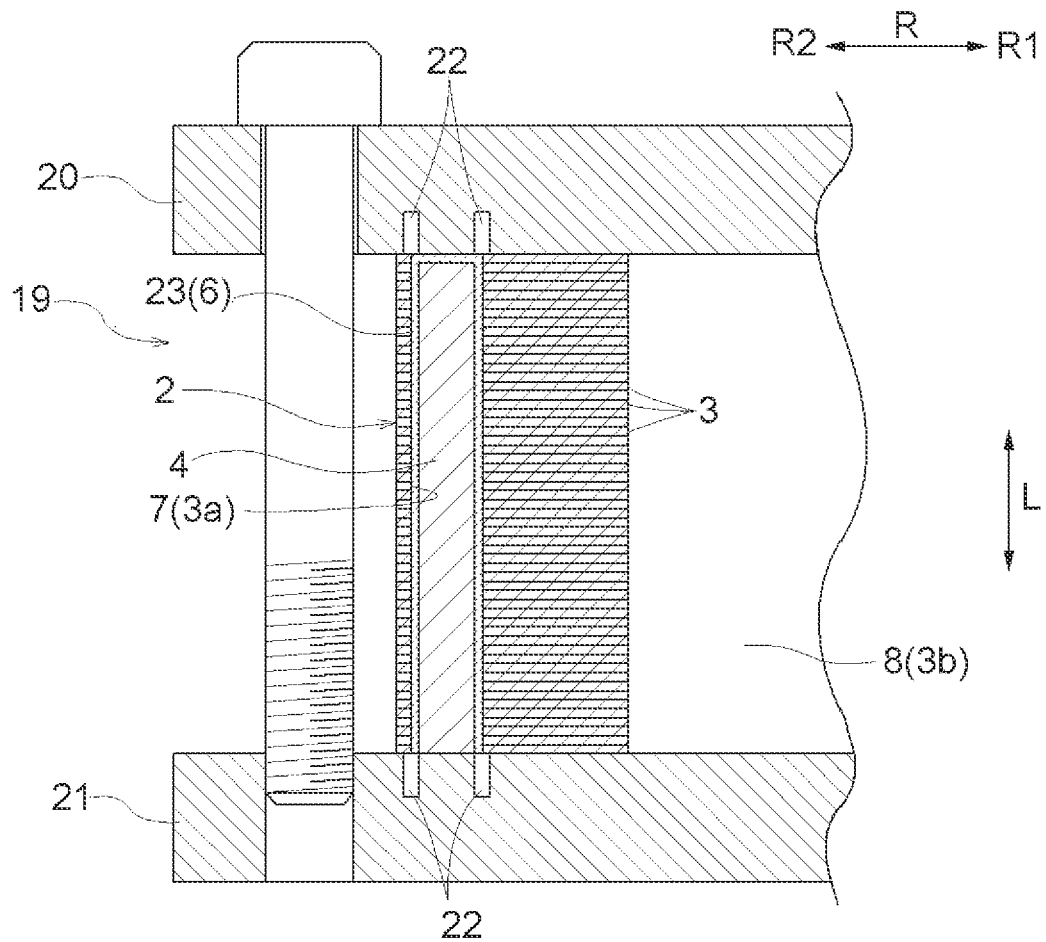
FIG. 12 is a side sectional view of a pressing device.

Specifically, in the magnet insertion step S2, the adhesive 23 is applied to the permanent magnets 4 or the magnet insertion holes 7 before the permanent magnets 4 are inserted in the magnet insertion holes 7. Then, as shown in FIG. 12, in the resin curing step S3, pressure is applied to the rotor core 2 in the axial direction L by an upper plate 20 and a lower plate 21 of a pressing device 19. The pressure applied to the rotor core 2 in the axial direction L by the upper plate 20 and the lower plate 21 is maintained until the adhesive 23 solidifies, so that the inner surfaces of the magnet insertion holes 7 and the outer surfaces of the permanent magnets 4 are fixed together. Grooves 22 are formed in the upper plate 20 and the lower plate 21 of the pressing device 19. The grooves 22 release the adhesive 23 that overflows from the magnet insertion holes 7 when pressure is applied to the rotor core 2 in the axial direction L by the upper plate 20 and the lower plate 21. An epoxy resin adhesive may be used as the adhesive 23, for example. A foaming adhesive in which expanding capsules are contained in the epoxy resin may also be used as the adhesive 23.

Figure 13:
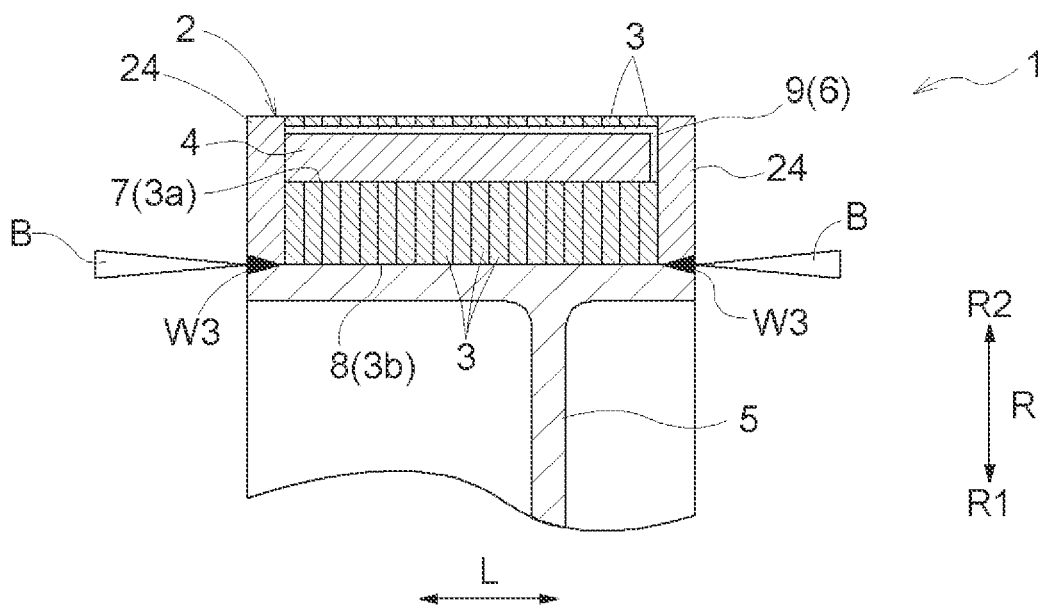
FIG. 13 is an axial sectional view of the rotor that has end plates.

(2) In the above embodiment, an example in which the fixing members are not provided on both ends of the rotor core 2 in the axial direction L was described. However, as shown in FIG. 13, end plates 24 may be provided on both ends of the rotor core 2 in the axial direction L as the fixing members. In this way, when the end plates 24 are provided on both ends of the rotor core 2, the hub 5 is inserted in the electromagnetic steel plates 3 and the two end plates 24, and the energy beams B are irradiated to the circumferential portion in which the hub 5 abuts against the end plates 24, so as to weld the hub 5 and the end plates 24 together. Third molten and solidified portions W3 are formed on the portions in which the hub 5 abuts against the end plates 24.

(3) In the above embodiment, an example in which the second pressure is lower than the first pressure is described. However, cases in which the second pressure is equal to the first pressure, or cases in which the second pressure is higher than the first pressure are not excluded. Additionally, cases in which the second pressure is zero are not precluded.

(4) In the above embodiment, an example in which welding is performed on the inner peripheral surface of the rotor core 2 in the welding step S4 is shown.

However, welding may be performed on the outer peripheral surface of the rotor core 2 in the welding step S4.

(5) In the above embodiment, an example in which the rotor core 2 and the hub 5 are fixed is explained. However, the connection of the rotor core 2 and the hub 5 is not particularity limited to this. Thus, the inner peripheral surface of the rotor core 2 and the outer peripheral surface of the hub 5 may be fixed by other methods such as shrink fitting and using key grooves, instead of welding or in addition to welding.

(6) The structures disclosed in the above embodiments may be applied combined with the structures disclosed in the other embodiments as long as no inconsistency arises. Regarding other configurations as well, the embodiments disclosed in the specification are shown by way of example only in all respects. Thus, various modifications may be made as appropriate without departing from the spirit and scope of the present disclosure.

4. Summary of Embodiments

A summary of the manufacturing method of the rotor (1) described above will be described.

The manufacturing method of the rotor (1) described above includes: the core preparation step (S1) of preparing the rotor core (2) that is structured by stacking the electromagnetic steel plates (3) in the axial direction and that has the magnet insertion hole (7) which extends in the axial direction; the magnet insertion step (S2) of inserting the permanent magnet (4) in the magnet insertion hole (7); the resin curing step (S3) of curing the resin (9) provided between the inner surface of the magnet insertion hole (7) and the outer surface of the permanent magnet (4) while pressure is applied to the rotor core (2) in the axial direction (L), after the magnet insertion step (S2); and the welding step (S4) of welding the electromagnetic steel plates (3) along the axial direction (L), after the resin curing step (S3).

According to the manufacturing method, the welding step (S4) is performed after the resin curing step (S3). In the resin curing step (S3) performed before the welding step (S4), the electromagnetic steel plates (3) can be integrated by curing the resin (9) between the inner surface of the magnet insertion hole (7) and the outer surface of the permanent magnet (4).

Additionally, by applying pressure to the electromagnetic steel plates (3) in the axial direction (L) when curing the resin (9) between the inner surface of the magnet insertion hole (7) and the outer surface of the permanent magnet (4) in this way, the occupying ratio of iron in the rotor core (2) in which the electromagnetic steel plates (3) are integrated as described above can be increased and the density of the rotor core (2) can be increased.

In the electromagnetic steel plates (3), the inner surface of the magnet insertion hole (7) and the outer surface of the permanent magnets (4) are fixed with resin (9), in addition to welding of the electromagnetic steel plates (3), by the time welding of the electromagnetic steel plates (3) is completed, through executing the welding step (S4) after the resin curing step (S3). Thus, compared to when the electromagnetic steel plates (3) are only joined by welding, the rigidity to the residual stress in the axial direction (L) is higher and it is possible to suppress cracks from forming in the molten and solidified portion (W1) that joins the electromagnetic steel plates (3).

Here, it is preferable that the pressure applied to the rotor core (2) in the axial direction (L) in the resin curing step (S3) is the first pressure and that the welding step (S4) is performed while the second pressure smaller than the first pressure is applied to the rotor core (2) in the axial direction (L).

According to the above method, the electromagnetic steel plates (3) can be integrated with the occupying ratio of iron in the rotor core (2) increased, by curing the resin (9) between the inner surface of the magnet insertion hole (7) and the outer surface of the permanent magnet (4) while the first pressure is applied to the rotor core (2) in the resin curing step (S3). The residual stress that tends to extend in the axial direction (L) which acts on the rotor core (2) can be supported by the cured resin (9). Thus, even if the pressure applied in the axial direction (L) is decreased after the resin curing step (S3) is completed, it is possible to limit the electromagnetic steel plates (3) from moving apart from each other in the axial direction (L). Thus, it is sufficient that the second pressure when the welding step (S4) is performed is a pressure smaller than the first pressure, such as a pressure that limits the electromagnetic steel plates (3) from partially floating-up in the axial direction L during welding. The welding step (S4) can be performed more easily since the pressure applied in the axial direction (L) in the welding step (S4) may be reduced.

Here, it is preferable that the rotor core (2) has the through hole (8) that extends through the radial direction (R) center portion of the rotor core (2) in the axial direction (L) and that in the welding step (S4), the inner peripheral surface of the through hole (8) is welded.

In this method, when the rotor (1) is the inner rotor, the molten and solidified portions (W1) formed by welding are provided on the side away from the stator. Thus, it is possible to suppress the deterioration of magnetic characteristics of the rotor caused by the effects of the molten and solidified portions (W1). In the structure in which welding of the inner peripheral surface of the through hole (8) is performed and welding of the outer peripheral surface of the rotor core (2) is not performed, when the resin curing step (S3) is not performed before the welding step (S4) as in the above comparative example, the electromagnetic steel plates 3 tend to move away from each other in the axial direction L on the outer peripheral surface side of the rotor core (2). Thus, the stress that acts on the radial inner side welding portion is increased and cracks are easily formed in the molten and solidified portions (W1). However, in the structure of the embodiment above, the stress can be supported by the resin (9) provided between the inner surface of the magnet insertion hole (7) and the outer surface of the permanent magnet (4). Thus, the possibility of cracks forming in the molten and solidified portions (W1) can be reduced.

Here, it is preferable that the rotor core (2) has the through hole (8) that extends through the radial direction (R) center portion of the rotor core (2) in the axial direction (L), and that the manufacturing method further includes, after the welding step (S4), the support member fixation step (S5) of inserting the support member (5) in the through hole (8) and welding only the joining portions of the support member (5) and both ends of the rotor core (2) in the axial direction (L).

In this method, the support member (5) and the rotor core (2) can be joined by welding the joining portion of the support member (5) and both ends of the rotor core (2) in the axial direction (L). The electromagnetic steel plates (3) are integrated with the occupying ratio of iron increased, at the time the resin curing step (S3) is completed. Thus, there is no need to apply pressure to the rotor core (2) in the axial direction (L) during welding in the support member fixation step (S5). Thus, the support member fixation step (S5) can be simplified compared to when welding needs to be performed while applying pressure to the rotor core (2).

Here, it is preferable that the resin curing step (S3) includes the step of heating the rotor core (2) for curing the resin (9), and the welding step (S4) is performed with the temperature of the rotor core (2) higher than the atmospheric temperature due to heating in the resin curing step (S3).

In this method, the temperature of the rotor core (2) when starting the welding step (S4) can be kept higher than the atmospheric temperature. As a result, the temperature difference of the welding spots between before and after welding can be reduced, and thus the possibility of crack forming in the welding spots can be reduced.

Here, it is preferable that the inner surface of the magnet insertion hole (7) and the outer surface of the permanent magnet (4) are fixed together by the resin (9) in the resin curing step.

In this method, the electromagnetic steel plates (3) can be surely integrated. Thus, the rigidity of the electromagnetic steel plates (3) to the residual stress in the axial direction (L) can be further increased. As a result, crack formation in the welding spots (W1) can be further suppressed.

Here, it is preferable that the resin (9) is expanded and cured by heating, and that the magnet insertion step (S2) is performed with the resin (9) applied to the permanent magnet (4).

In this method, the electromagnetic steel plates (3) can be integrated by the resin (9) cured by heating. Additionally, by using the characteristic of the resin (9) expanding by heating, it is easier to appropriately perform the positioning of the permanent magnet (4) inside the magnet insertion hole (7). For example, the resin (9) may be expanded so that the permanent magnet (4) is pressed against either inner surface of the magnet insertion hole (7). Additionally, in the magnet insertion step (S2), when the permanent magnet (4) is inserted in the magnet insertion hole (7), certain gaps can be formed between the outer surface of the permanent magnet (4) and the inner surface of the magnet insertion hole (7), since the resin (9) has not expanded yet. Thus, it is possible to suppress the resin material (9) applied to the permanent magnet (4) from coming into contact with the inner surface of the magnet insertion hole (7) and peeling off while the permanent magnet (4) is being inserted in the magnet insertion hole (7).

Here, it is preferable that the welding step (S4) is performed by laser welding.

In this method, localized heating is possible and thus the welding spots can be heated surely.

INDUSTRIAL APPLICABILITY

The method of the disclosure can be used for manufacturing a rotor.

The invention claimed is:
1. A manufacturing method of a rotor comprising:
preparing a rotor core that is structured by stacking a plurality of electromagnetic steel plates in an axial direction and that has a magnet insertion hole which extends in the axial direction;
inserting a permanent magnet in the magnet insertion hole;
curing a resin provided between an inner surface of the magnet insertion hole and an outer surface of the permanent magnet while pressure is applied to the rotor core in the axial direction, after the permanent magnet is inserted in the magnet insertion hole, and thereby integrating all of the plurality of electromagnetic steel plates and fixing all of the plurality of electromagnetic steel plates to the permanent magnet; and
welding the electromagnetic steel plates along the axial direction after curing the resin, wherein the welding includes a welding of the plurality of electromagnetic steel plates in the rotor core continuously over a partial area of the rotor core in the axial direction.

2. The manufacturing method of a rotor according to claim 1, wherein
the inner surface of the magnet insertion hole and the outer surface of the permanent magnet are fixed together by the resin when curing the resin.

3. The manufacturing method of a rotor according to claim 2, wherein
the pressure applied to the rotor core in the axial direction when curing the resin is a first pressure, and
the welding is performed while a second pressure smaller than the first pressure is applied to the rotor core in the axial direction.

4. The manufacturing method of a rotor according to claim 3, wherein
the rotor core has a through hole that extends through a radial center portion of the rotor core in the axial direction, and
when welding the electromagnetic steel plates, an inner peripheral surface of the through hole is welded.

5. The manufacturing method of a rotor according to claim 3, wherein
the rotor core has a through hole that extends through a radial center portion of the rotor core in the axial direction, and
the method further includes, after welding the electromagnetic steel plates, inserting a support member in the through hole and welding only joining portions of the support member and both ends of the rotor core in the axial direction.

6. The manufacturing method of a rotor according to claim 3, wherein
curing the resin includes heating the rotor core for curing the resin, and
welding the electromagnetic steel plates is performed with a temperature of the rotor core higher than an atmospheric temperature due to heating when curing the resin.

7. The manufacturing method of a rotor according to claim 6, wherein the resin is expanded and cured by heating, and inserting the permanent magnet is performed with the resin applied to the permanent magnet.

8. The manufacturing method of a rotor according to claim 6, wherein
welding the electromagnetic steel plates is performed by laser welding.

9. The manufacturing method of a rotor according to claim 3, wherein
the resin is expanded and cured by heating, and
inserting the permanent magnet is performed with the resin applied to the permanent magnet.

10. The manufacturing method of a rotor according to claim 3, wherein
welding the electromagnetic steel plates is performed by laser welding.

11. The manufacturing method of a rotor according to claim 2, wherein
the rotor core has a through hole that extends through a radial center portion of the rotor core in the axial direction, and
when welding the electromagnetic steel plates, an inner peripheral surface of the through hole is welded.

12. The manufacturing method of a rotor according to claim 2, wherein
the rotor core has a through hole that extends through a radial center portion of the rotor core in the axial direction, and
the method further includes, after welding the electromagnetic steel plates, inserting a support member in the through hole and welding only joining portions of the support member and both ends of the rotor core in the axial direction.

13. The manufacturing method of a rotor according to claim 2, wherein
curing the resin includes heating the rotor core for curing the resin, and
welding the electromagnetic steel plates is performed with a temperature of the rotor core higher than an atmospheric temperature due to heating when curing the resin.

14. The manufacturing method of a rotor according to claim 13, wherein
the resin is expanded and cured by heating, and
inserting the permanent magnet is performed with the resin applied to the permanent magnet.

15. The manufacturing method of a rotor according to claim 13, wherein
welding the electromagnetic steel plates is performed by laser welding.

16. The manufacturing method of a rotor according to claim 2, wherein
the resin is expanded and cured by heating, and
inserting the permanent magnet is performed with the resin applied to the permanent magnet.

17. The manufacturing method of a rotor according to claim 2, wherein
welding the electromagnetic steel plates is performed by laser welding.

18. A manufacturing method of a rotor comprising:
preparing a rotor core that is structured by stacking a plurality of electromagnetic steel plates in an axial direction and that has a magnet insertion hole which extends in the axial direction;
inserting a permanent magnet in the magnet insertion hole;
curing a resin provided between an inner surface of the magnet insertion hole and an outer surface of the permanent magnet while pressure is applied to the rotor core in the axial direction, after the permanent magnet is inserted in the magnet insertion hole, and thereby integrating all of the plurality of electromagnetic steel plates and fixing all of the plurality of electromagnetic steel plates to the permanent magnet; and
welding the electromagnetic steel plates along the axial direction after curing the resin, wherein the welding includes a welding of the plurality of electromagnetic steel plates in the rotor core continuously over an entire area of the rotor core in the axial direction.

* * * * *